Nov. 18, 1969     R. COURSAULT     3,479,079
DEVICES FOR CONVERTING A PASSENGER AUTOMOBILE INTO A
UTILITY VEHICLE
Filed May 7, 1968

INVENTOR
ROGER COURSAULT

By Stevens, Davis, Miller & Mosher
ATTORNEYS

United States Patent Office 3,479,079
Patented Nov. 18, 1969

3,479,079
DEVICES FOR CONVERTING A PASSENGER AUTOMOBILE INTO A UTILITY VEHICLE
Roger Coursault, Billancourt, France, assignor to Regie Nationale des Usines Renault, Billancourt, France
Filed May 7, 1968, Ser. No. 727,243
Claims priority, application France, May 19, 1967, 107,083
Int. Cl. B60j 7/10; B62d 33/04
U.S. Cl. 296—26
4 Claims

ABSTRACT OF THE DISCLOSURE

A movable frame structure comprising two substantially triangular rod assemblies mounted on the lower edge of the opening of the rear luggage compartment of the vehicle and holding the rigid vertical panel thereof in its substantially horizontal raised position, and flexible panels tensioned on this frame structure and closing the rear of the vehicle.

Figure 1:
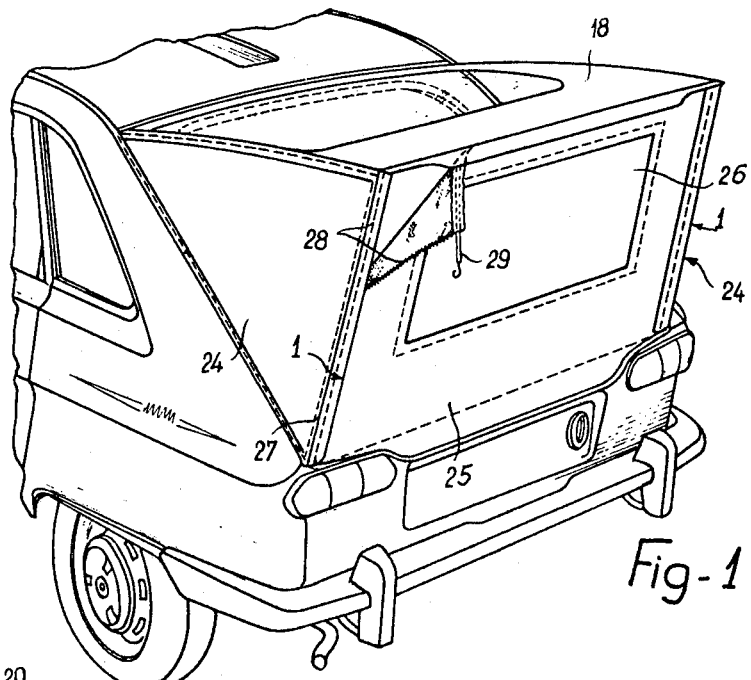

The present invention relates to a device for converting a passenger automobile into a utility vehicle. This device is applicable more particularly to vehicles of the type having a rear door or deck lid giving access to the luggage compartment and having its hinge disposed transversely, substantially at the level of the rear portion of the roof.

Automotive vehicles of the type broadly set forth hereinabove are already known wherein the rear compartment is convertible to permit a transformation corresponding to the particular use for which the vehicle is momentarily intended.

As a rule, in these vehicles the rear panel is rigid with lateral panels of the body which carry windows or not, and with a rear window glass, which are both retractable into the trunk when the rear panel is lowered, and which on the other hand constitute walls increasing the volume of the rear compartment when the rear panel is raised and locked in a position to constitute somewhat the extension of the roof.

This arrangement is objectionable for different reasons:

The complications thus introduced in the construction of the rear portion of the vehicle increase its cost;
In an installation of this type it is particularly difficult to successfully combine a reliable operation with a perfect tightness in both rear panel positions;
Finally, when the vehicle is operated in its passenger version the room available in the luggage compartment is reduced at least by the space necessary for receiving the lateral walls associated with the rear panel.

It is the essential object of the present invention to provide a device capable of avoiding these inconveniences. The device according to this invention is characterised in that it consists on the one hand of a detachable frame structure adapted to be mounted on the edge of the opening of the rear or luggage compartment of an automobile vehicle, and to keep the rear panel thereof in a substantially horizontal raised position, and on the other hand of flexible panels tensioned on this frame structure for constituting the rear end of the vehicle.

This device is easily detachable and in its folded position its dimensions are so reduced that it can easily be placed in the luggage compartment or even tucked away in the passenger compartment without causing any interference.

Figure 2:
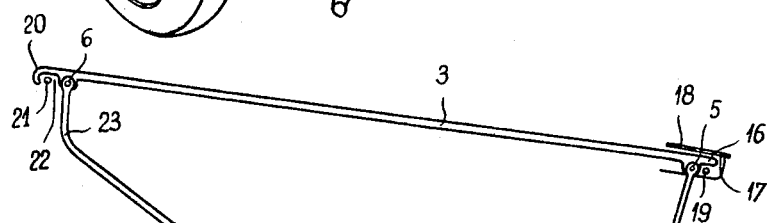

Other features and advantages of this invention will appear as the following description proceeds with reference to the accompanying drawing illustrating diagrammatically by way of example a typical form of embodiment of the device. In the drawing:

FIGURE 1 is a perspective view showing the rear portion of an automobile vehicle equipped with this device;
FIGURE 2 is a side elevational view of one of the elements of the frame structure of the device, and
FIGURE 3 is a similar view showing the frame structure element in its folded position.

Referring first to FIGURE 1, the dash lines show the frame structure of the device which comprises essentially two identical lateral frame elements 1 disposed parallel to each other at the rear of the vehicle.

Figure 3:
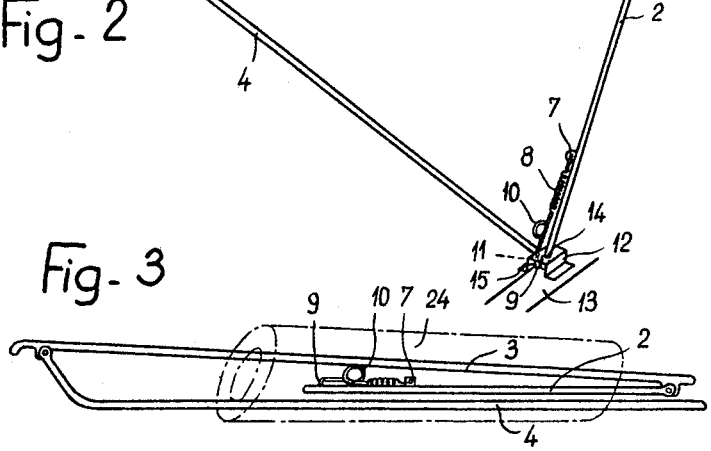

As shown in FIGURE 2, each frame element 1 consists of three rods or sections 2, 3 and 4 hingedly interconnected at 5 and 6 to constitute a triangular structure adapted to be folded as shown in FIGURE 3.

The rear rod 2 comprises at about one third of its length from the bottom an integral lug 7 for attaching one end of a tension spring 8 carrying at its opposite end a hook 9 provided with a ring 10. This hook 9 is engageable in an orifice 11 formed in a member 12 adapted to straddle the lower edge 13 of the rear opening of the vehicle and to receive in a hole 14 the lower end of the rear rod 2 and in another hole 15 the rear end of the lower rod 4. The function of ring 10 consists, of course, in facilitating the handling of the hook 9.

The upper or top rod 3 has a rear end 16 adapted to be fitted between the upper edge 17 of the rear hinged panel 18 of the vehicle and a pin 19 disposed laterally to said panel. The opposite or front end of rod 3 has an integral hook portion 20 adapted to engage a pin 21 disposed in the vicinity of the hinge (not shown) of the rear panel 18 of the vehicle. A sufficient clearance 22 is provided to permit the mounting of this rod.

The lower rod 4 comprises an upswept front portion 23 constituting a bracing element in the vicinity of the pivot pin 6.

The walls of the device consist of two flexible symmetrical lateral panels 24 and of a rear flexible panel 25 comprising a transparent portion 26 substituted for the rear window glass when the device is used.

These flexible panels 24 are secured to the rods 3 and 4 through any suitable and known means. Their substantially vertical rear edge 27 comprises a zip fastener 28 for securing the rear panel 25. The assembly is tensioned by providing elastic tensioning cords 29 disposed across the upper and lower portion of the rear panel 26 and adapted to be attached to the rods 2.

When the device is removed and folded, and the flexible panels are wound on the frame structure, very little space is required for stowing it in the vehicle.

Although a preferred and exemplary form of embodiment has been described and illustrated herein, it will be readily understood that various modifications and variations may be brought thereto without departing from the spirit and scope of the invention.

I claim:

1. A device for temporarily converting a passenger automotive vehicle having a rear door panel hinged on the rear end of the vehicle roof into a utility vehicle and closing the rear luggage compartment of the vehicle, said device comprising a detachable frame structure consisting of two separate triangled elements adapted to be mounted each laterally on the upper and lower edge of the opening of said compartment and to maintain said rear door panel in a substantially horizontal raised position, and flexible panels tensioned on said frame structure for closing the rear and the sides of said framework structure, said frame structure elements being identical and each consisting of an upper rod having pivotally connected at its ends the ends of a lower rod and of a rear rod having their free ends engageable in a member straddling the lower edge of the rear opening of the vehicle, said three rods constituting together a triangular assembly.

2. A device according to claim 1, wherein the front end of said upper rod is hook-shaped and adapted to engage a pin disposed laterally to the rear panel of the vehicle, in the vicinity of its hinge, the rear end of said upper rod fitting between the upper edge of the panel and a pin disposed laterally thereto.

3. A device according to claim 1, wherein a tension spring is attached to said rear rod, and a hook portion formed with said spring being adapted to be anchored to said member straddling the lower edge of the vehicle's rear opening.

4. A device according to claim 1, wherein a triangular flexible lateral panel is secured to said upper and lower rods of each said frame structure element and a flexible rear panel is fastened to the substantially vertical edges of said lateral panels by known zip fasteners and to said rear rods by means of transverse tension cords.

References Cited
UNITED STATES PATENTS

| | | | |
|---|---|---|---|
| 3,082,033 | 3/1963 | Bosher | 296—26 |
| 3,107,649 | 10/1963 | Blend | 296—37 |

LEO FRIAGLIA, Primary Examiner

R. R. SONG, Assistant Examiner

U.S. Cl. X.R.

296—99